June 2, 1942.　　　F. B. WALDRON　　　2,285,318
APPARATUS FOR POLISHING GLASS
Filed Dec. 10, 1940
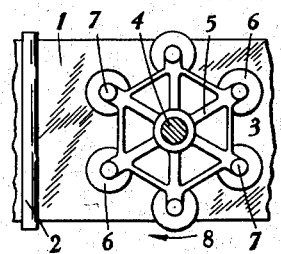
Fig. 1.
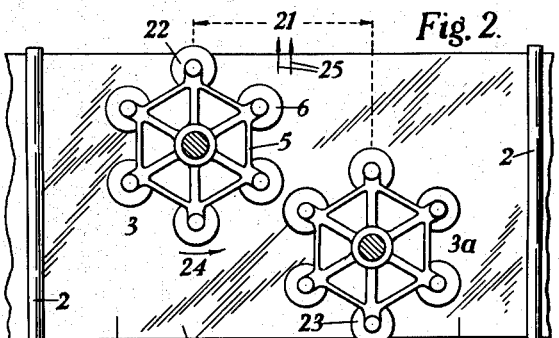
Fig. 2.
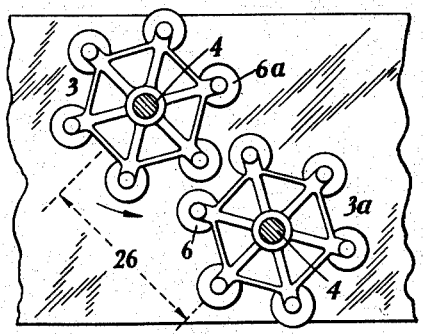
Fig. 3.
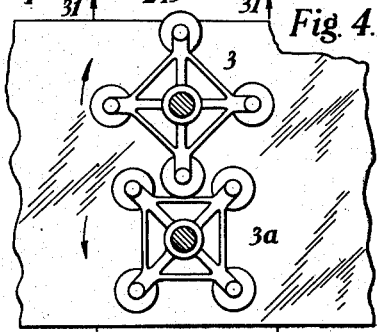
Fig. 4.
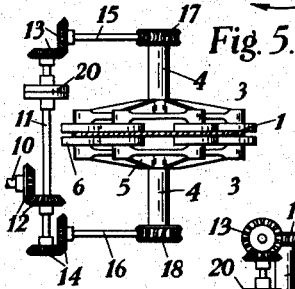
Fig. 5.
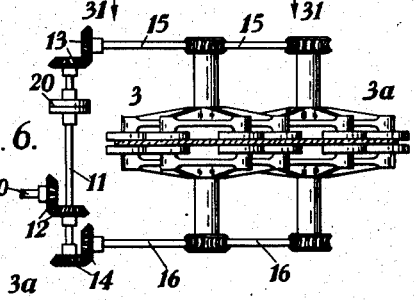
Fig. 6.
Fig. 7.
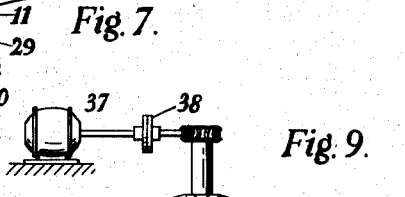
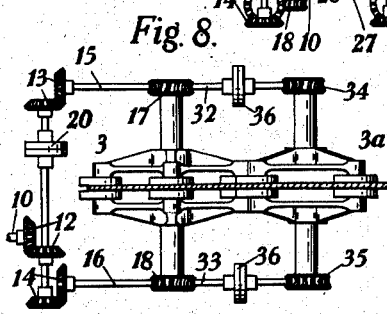
Fig. 8.
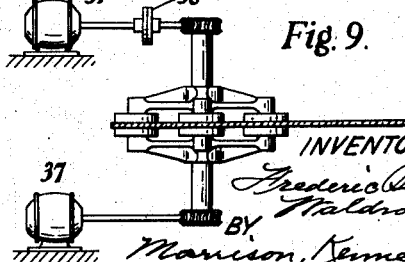
Fig. 9.
INVENTOR
Frederic Barnes Waldron
BY
Morrison, Kennedy
& Campbell
ATTORNEYS.

Patented June 2, 1942

2,285,318

UNITED STATES PATENT OFFICE 2,285,318

APPARATUS FOR POLISHING GLASS

Frederic Barnes Waldron, Prescot, England, assignor to Pilkington Brothers Limited, Liverpool 2, England, a British company Application December 10, 1940, Serial No. 369,437
In Great Britain December 6, 1939

13 Claims. (Cl. 51—112)

This invention relates to apparatus for polishing glass.

In the manufacture of plate glass in strip form in which both sides of the strip are polished simultaneously, polishing tools are employed which comprise a plurality of spaced polishing discs which are mounted on a frame which is rotated on an axis perpendicular to the glass. Usually such tools are placed in co-axial pairs so that one tool as a whole serves as a support for the glass against the pressure exerted by the other tool. The tools customarily have a diameter slightly greater than the width of the strip of plate glass being treated.

In order to avoid engendering a turning movement of the strip of glass about the axis of the tools, which would tend to displace the glass sideways, the two tools of a pair are driven in opposite directions, one clockwise and the other anti-clockwise. In this arrangement, however, the discs of one tool are only momentarily immediately opposite the discs of the other tool and in all other relative positions of the two tools the discs of one tool are between the discs of the other and then the opposed pressures applied by the two tools tend to bend the glass.

In the operation of polishing plate glass simultaneously on both sides, temperature differences are set up in the glass which are conducive to breakage and the bending moment applied by the discs of the two tools when in staggered relation tends in such circumstances to lead to breakage of the glass, and the two circumstances limit the power which can be applied to the tools for the operation of polishing the glass.

The main object of the present invention is to achieve efficient polishing of glass in strip form and to eliminate bending moments in the glass in the zone which is being polished.

Another object is to devise a means of applying a greater polishing pressure than has hitherto been applied to glass, so that either a lesser number of tools may be employed, or a greater output obtained from a given number of tools.

A further object is to achieve efficient polishing of glass and to direct and maintain the glass in a predetermined straight line movement.

In accordance with the present invention the method of polishing glass in strip form on both faces simultaneously as it is advanced lengthwise in a linear path, consists in applying to the two faces of the strip simultaneously equal and directly opposed rubbing forces at a plurality of individual points in a direction normal to the plane of the glass and moving each pair of opposed forces together in the same direction at the same speed in one circular path over a zone of the glass, the strip of glass moving continuously forward in the plane to which the opposed forces are normals.

By such method of operation there is no tendency for the pressures applied, to bend the glass in the zone being polished.

The invention also consists in the further step of applying a similar rubbing force to the two faces of a contiguous zone of the glass, the circular movement being in a sense opposite to the sense in the first mentioned zone.

By such method of operation any forces generated which would tend to move the strip laterally are either considerably neutralised or balanced. Considering, however, shorter lengths of glass which correspond to the diameter of the tools employed, there are sideway forces which are unbalanced, and in accordance with the invention the contiguous zones, which are simultaneously operated upon, overlap to reduce these unbalanced forces, and the invention comprises the application of the opposed rubbing forces on the two faces of the glass over two zones which overlap in a direction coincident with the middle line of the glass, so that the only unbalanced forces are those acting longitudinally of the strip, and which tend to direct and maintain the strip in a straight line during its forward movement between the polishers.

Apparatus for polishing glass in strip form constructed according to the present invention comprises rollers for driving the glass forward in a linear path, spaced along said path, a co-axial pair of frames between two of said spaced rollers, each frame carrying rotatable polishing discs spaced apart of which the axes are parallel to the axes of the frames and equidistant therefrom, the discs of one frame operating on one face of the glass and the discs on the opposed frame on the other face of the glass, the discs on the one frame being all similar to and in register with the respective opposed discs of the other frame, means for driving both frames at the same speed in the same direction and for maintaining the discs on the one frame always in register with the discs on the other frame. By such construction the two tools of each pair are similar and are rotated in the same direction and are so adjusted that the discs of one tool are always immediately opposite to discs of the other tool. By such an arrangement the glass strip is fully supported against the pressure of any one disc by the opposed disc of the tool on the other side of the glass, and there is no tendency to bend the glass in the zone being polished.

The tendency to generate a turning movement in the glass about the tools may be counteracted in any well known way, e. g. the feed rollers between the pairs of co-axial polishing tools may be devised to prevent lateral creep or to apply a driving pressure across the direction of creep, but the present invention comprises also simple and effective means of avoiding turning movements which might lead to breakage of the strip, and apparatus according to the invention may comprise between two of the said spaced driving rollers a juxtaposed couple of pairs of co-axial frames and means for driving one coaxial pair in a clockwise direction and for driving the other coaxial pair of frames in an anti-clockwise direction and all at the same speed.

The polishing tools may each comprise a frame carrying a plurality of discs arranged in an annulus which give to the tool an effective diameter which is slightly greater than the width of the glass strip. Preferably, however, two pairs of tools of relatively small diameter are placed close together, the axes of the two pairs being placed on a line disposed obliquely across the strip.

The sideway forces of the strip, that is those forces tending to move the strip laterally, are not completely balanced in such an arrangement, and they are the more unbalanced the more oblique is the line of the axes across the strip. However, the line of the axes may be considerably oblique without the unbalanced sideway forces being sufficient to endanger the glass by engendering a strong turning movement, and the advantage of such an arrangement is that the disposition of the two pairs permits the tools to be of a large diameter as compared with the effective diameter of tools when the line connecting the axes is at right angles to the strip. When the line containing the axes of the pairs of tools is oblique to the strip, the tools may be of relatively small diameter and placed close together, and preferably with the discs of one pair overlapping the discs of the other pair, the tools of the two pairs being turned in opposite directions, and synchronised in order that the discs of one pair can pass the discs of the other pair like two tooth wheels in mesh.

If the axes of the two pairs lie in a transverse line across the strip, any forces tending to move the strip laterally are completely balanced and the only unbalanced forces are those acting longitudinally of the strip, that is in a direction to direct and maintain the strip in a straight line path. However, to secure efficient polishing along the centre line of the strip, it is essential that the tools of the two pairs should overlap and this entails synchronising the two pairs so that at the overlapping area, which is disposed longitudinally and medially of the strip, discs of one pair pass between the discs of the other pair. In such constructions the diameter of the tools is somewhat in excess of half the width of the strip.

The two tools of the two pairs on one side of the strip are preferably driven either each by its own motor or by a single motor, while the two tools on the other side are driven by independent motors or an independent motor. The tools on the two sides of the strip are then synchronised by a shaft perpendicular to the strip geared to the tools of the two sides, or by employing motors electrically synchronised. The two tools of a pair may be driven by a single motor, but in this case the gearing must be capable of transmitting the full power required by each tool.

In order that the invention may be more clearly understood reference will now be made to the accompanying diagrammatic drawing which show by way of example preferred embodiments thereof.

In the drawing:

Figure 1 is a plan view of part of a polishing apparatus constructed according to the invention.

Figure 2 is a part plan view of a polishing apparatus according to the invention wherein co-operating pairs of tools operate on closely disposed zones of the glass and counteract the unwanted turning movements generated by the pairs.

Figures 3 and 4 are views similar to Figure 2 of alternate forms of polishing apparatus wherein the contiguous zones of operation overlap and the line joining the pairs of co-operating pairs of tools lies transversely of the strip. In Figure 3 said line is disposed obliquely of the strip and in Figure 4 the line is at right angles to the length of the strip.

Figure 5 is a transverse section through a polishing apparatus showing driving means for the tools.

Figure 6 is a transverse section through the polishing apparatus of Figure 2 showing driving means for the tools.

Figure 7 is a side view of the polishing apparatus of Figure 3 showing driving means therefor.

Figure 8 is a transverse section through the polishing apparatus of Figure 4, showing driving means therefor; and Figure 9 is a transverse section through a polishing apparatus showing an alternative form of driving means.

In the drawing like references designate the same or similar parts.

Referring first to Figure 1, the polishing apparatus comprises a plurality of equally spaced co-axial pairs of polishing tools of known form only one pair of which is shown and generally designated 3, between which pairs of tools the horizontal strip of glass 1 is driven by rollers 2. Only the upper tool 3 of each pair is visible, the lower tool being on the lower side of the strip 1, immediately below the upper tool.

Each tool is rotated on a vertical shaft 4, and the shafts of the two tools of each pair are in a line. A frame 5 is carried by the shaft 4 and a plurality of polishing discs 6 are rotatably mounted in the frame by pivot pins 7. The pivots 7 of the visible frame are co-axial with pivots 7 of the frame on the lower side of the strip. The effective diameter of each tool, that is to say the diameter of the circle swept out by the polishing discs, is in such constructions slightly greater than the width of the glass.

The two tools of a pair are rotated at the same speed in the same sense indicated by arrow 8, and are maintained in relative angular position so that the polishing discs of one tool are always in register, that is to say, opposite to the discs of the other tool, and apply to the two faces of the glass simultaneously, equal and directly opposed rubbing forces in a continuous circular rubbing movement over a zone of the glass, the strip of glass being advanced continuously by the driving rollers 2 in a linear path in the plane to which the opposed forces are normals.

Thereby the glass is not subjected to any bending action due to the pressure of the tools on the glass, and the polishing discs operate continuously on firmly supported flat glass.

Figure 5 shows the two tools 3 of the pair shown in Figure 1, with one form of driving means shown diagrammatically. The driving shaft 10 drives the vertical shaft 11 through bevel gears 12. Bevel gears 13 and 14 at the upper and lower ends respectively of the shaft 11, drive shafts 15 and 16, which drive the shafts 4 of the upper and lower tools respectively by means of worm gears 17 and 18. The shaft 11 is in two parts connected by a coupling 20, whereby the angular position of the two parts, and therefore of the two tools 3, may be adjusted, so that the discs 6 of the upper and lower tools are in register with one another. The gearing provides for the two tools rotating in the same sense.

The tendency to generate a turning movement in the glass is mitigated in accordance with the invention, by disposing two pairs of polishing tools close together, i. e. in couples as shown in Figure 2, so that the apparatus will comprise a plurality of pairs of tools located in couples. Two pairs of tools 3 and 3a are arranged as a couple of pairs, with the distance 21 between the axes 4 of the pairs, measured in the direction of the length of the strip, less than the effective diameter of each tool. Each tool has a diameter greater than half the width of the strip, so that they overlap to a considerable extent, the centre of the glass strip 1, and one tool of one pair extends beyond one edge of the strip at 22 and the tool of the other pair on the same side of the strip extends beyond the other edge at 23. The two pairs 3 and 3a are rotated in opposite senses as shown by the arrows 24, and then, considering the whole length of glass between the rollers 2, 2, there is balance between the forces exerted by the two pairs 3 and 3a which would tend to throw the glass sideways, as shown by the arrows 25. The tools 3a, 3a may have an effective diameter equal to the tools illustrated in Figure 1.

The driving means for the two pairs is shown diagrammatically in Figure 6, that for each pair being similar to the driving means shown in Figure 5 and independent one from the other. The gearing for the pair 3a is behind that for the pair 3.

Considering, however, shorter lengths of glass, the sideway forces are still unbalanced, and the generation of a turning movement in the glass can be further mitigated by the arrangement of a plurality of pairs of polishing tools located in couples as shown in Figure 3, in which the two pairs 3 and 3a of the couple are still closer together, so that the distance 26 between their axes 4 measured from axis to axis, is less than the operative diameter of the tools. In this case, however, the polishing discs of one pair of tools overlap the path of those of the other pair of tools and the two pairs of the couple are connected together by gearing so that they turn at the same speed in opposite senses. Thereby, a polishing disc 6a of one tool 3, enters the space between two polishing discs 6 of the other tool 3a, as the tools turn, as shown in Figure 3. The gearing for the two pairs of tools is shown diagrammatically in Figure 7. The driving shaft 10 actuates a shaft 27 through bevel gears 28, and the shaft 27 drives the two vertical shafts 11, which drive the two tools of each pair, through bevel gears 29, so that the two pairs of tools turn in opposite senses. The shaft 28 is in two parts connected by a coupling 30, whereby the relative angular positions of the tools of the two pairs may be adjusted so that the movements of the polishing discs are synchronised and the tools of one pair enter the spaces between those of the tools of the other pair as the discs operate on the middle area of the glass strip.

Figure 4 shows an arrangement of a plurality of pairs of polishing tools located in couples in which the forces tending to produce a turning movement in the strip are balanced as fully as possible. The two pairs of tools 3 and 3a of the couple have their axes on a line transversely disposed of the strip, the line being at right angles to the length of the strip of glass, that is to say the major dimension of the overlap lies in a direction coincident with the middle line of the glass strip, and then, as shown by the arrows 31, the sideway forces are balanced. There are unbalanced forces in the direction of the length of the strip, but these do not generate a turning movement but rather assist in directing the glass along the desired straight line path. In such arrangement the effective diameter of the tools is somewhat in excess of half the strip width.

The two pairs of tools 3 and 3a of the arrangement of Figure 4 may be driven by means shown in Figure 8, similar to the driving means of Figure 5, but with the shafts 15 and 16 extended at 32 and 33 respectively to drive the tools 3a by worm gears 34 and 35. If the worm gears 17 and 18 have right hand threads, the worm gears 34 and 35 have left hand threads. Couplings 36 are provided for adjustment.

The polishing tools shown each have a single ring of polishing discs, but they sometimes may be provided with a second series of polishing tools having discs arranged at smaller radii. In every case, however, the upper and lower tools of each pair are similar so that each disc on one tool is co-axial with and in register with a disc on the other tool, each serving to support the pressure exerted on the glass by the opposed tool.

Other means than the gearing shown may be employed for synchronising one tool with another; thus each tool may be driven independently by a synchronous motor 37 (Figure 9) provided that the number of poles in the motor and the gearing between the motor and the tool is such that any phase difference liable to occur between one motor and another does not correspond to an appreciable difference in the angular position of one tool relatively to the other of a pair. A coupling 38 is provided in the driving shaft of one of the motors.

The synchronising means for adjusting the relative angular positions of the two pairs of a couple may be constituted by the gearing itself. Thus, the necessary adjustment may be made during erection of the apparatus by suitably engaging the two bevel wheels 13, provided that the angular distance between one tooth and the next on these gears corresponds to a small enough difference in position of a polishing disc.

The apparatus is applicable to polishing a continuous strip of glass or separate lengths of glass strip.

I claim:

1. Apparatus for polishing glass in strip form, comprising rollers for driving the glass forward in a linear path, spaced along said path, a coaxial pair of rotatable frames between two of said rollers, each frame carrying rotatable polishing discs spaced apart of which the axes are parallel to the axes of the frames and equidistant therefrom, the discs of one frame operating on one face of the glass and the discs on the opposed frame on the other face of the glass, the discs on the one frame being all similar to and in register with the respective opposed discs on the other frame, means for driving both frames at the same speed in the same direction and for maintaining the discs on the one frame always in register with the discs on the other frame.

2. Apparatus for polishing glass in strip form, comprising rollers for driving the glass forward in a linear path, spaced along said path, a coaxial pair of rotatable frames and a juxtaposed coaxial pair of rotatable frames between two of said spaced rollers, the axes of the pairs of frames being parallel, each frame of each pair carrying rotatable polishing discs spaced apart, the axes of said discs being parallel to the axis of the frame and equidistant therefrom, the discs on one of the frames in each pair of frames operating on one face of the glass and the discs on the opposed frames on the other face of the glass, the discs on one frame of each pair being all similar to and in register with the respective opposed discs on the other frame of the pair, and means for driving the two frames of one coaxial pair in a clockwise direction at the same speed and for driving the two frames of the other coaxial pair together in an anti-clockwise direction.

3. Apparatus for polishing glass in strip form, comprising rollers for driving the glass forward in a linear path, spaced along said path, a coaxial pair of rotatable frames and a juxtaposed coaxial pair of rotatable frames between two of said spaced rollers, the axes of the pairs of frames being parallel and close to one another on a line obliquely disposed with regard to the length of the strip to be polished so that the distance between their axes, measured in the direction of the length of the strip, is less than the operative diameter of each tool, each frame of each pair carrying rotatable polishing discs spaced apart, the axes of said discs being parallel to the axis of the frame and equidistant therefrom, the discs on one of the frames in each pair of frames operating on one face of the glass and the discs on the opposed frames on the other face of the glass, the discs on one frame of each pair being all similar to and in register with the respective opposed discs on the other frame of the pair, the polishing discs of one coaxial pair extending beyond one edge of the strip of glass and those of the other coaxial pair extending beyond the other edge, and means for driving the two frames of one coaxial pair in a clockwise direction at the same speed and for driving the two frames of the other coaxial pair together in an anti-clockwise direction.

4. Apparatus for polishing glass in strip form, comprising rollers for driving the glass forward in a linear path, spaced along said path, a coaxial pair of rotatable frames and a juxtaposed coaxial pair of rotatable frames between two of said spaced rollers, the axes of the pairs of frames being parallel and close to one another on a line transversely disposed with regard to the length of the strip to be polished so that the effective diameter of the frames overlap, each frame of each pair carrying rotatable polishing discs spaced apart, the axes of said discs being parallel to the axis of the frame and equidistant therefrom, the discs on one of the frames in each pair of frames operating on one face of the glass and the discs on the opposed frames on the other face of the glass, the discs on one frame of each pair being all similar to and in register with the respective opposed discs on the other frame of the pair, the opposed polishing discs of one coaxial pair extending beyond one edge of the strip of glass and those of the other coaxial pair extending beyond the other edge, and means for driving the two frames of one coaxial pair of frames in a clockwise direction at the same speed and for driving the two frames of the other coaxial pair in an anti-clockwise direction at the speed of the first mentioned pair, and means for adjusting the frames one with the other so that the discs of the one pair pass between the discs of the other pair, the effective diameter of each pair being somewhat in excess of half the width of the strip to be polished.

5. Apparatus for polishing glass in strip form, comprising rollers for driving the glass forward in a linear path, spaced along said path, a coaxial pair of rotatable frames and a juxtaposed coaxial pair of rotatable frames between two of said spaced rollers, the axes of the pairs of frames being parallel and close to one another on a line at right angles to the direction of movement of the strip, so that the effective diameter of the frames overlap, each frame of each pair carrying rotatable polishing discs spaced apart, the axes of said discs being parallel to the axis of the frame and equidistant therefrom, the discs on one of the frames in each pair of frames operating on one face of the glass and the discs on the opposed frames on the other face of the glass, the discs on one frame of each pair being all similar to and in register with the respective opposed discs on the other frame of the pair, the opposed polishing discs of one coaxial pair of frames extending beyond one edge of the strip of glass and those of the other coaxial pair extending beyond the other edge, and means for driving the two frames of one co-axial pair of frames in a clockwise direction at the same speed and for driving the two frames of the other coaxial pair in an anti-clockwise direction at the speed of the first mentioned pair, and means for adjusting the frames one with the other so that the discs of the one pair pass between the discs of the other pair, the effective diameter of each pair being somewhat in excess of half the width of the strip to be polished.

6. Apparatus for polishing a strip of glass on both sides simultaneously, comprising rollers for driving the glass forward in a linear path, spaced along said path, a plurality of pairs of polishing tools adapted to rotate on axes perpendicular to the glass, each pair being arranged between two of said spaced rollers, the two tools of each pair being similar and operating on opposite sides of the glass and having their axes in a line, each tool including a rotatable frame, a plurality of spaced polishing discs carried by the frame and equidistant from the axis thereof, means for adjusting the angular position of one tool relatively to that of the other tool of the pair so that discs on one tool are in register with the discs of the other tool, and means for rotating the two tools of a pair at the same speed in the same sense.

7. Apparatus for polishing a strip of glass on both sides simultaneously comprising a plurality of pairs of polishing tools located in couples, each tool being adapted to rotate on an axis perpendicular to the glass, the two tools of each pair being similar and operating on opposite sides of the glass and having their axes in a line, the distance between the axes of the two pairs of tools of each couple, measured in the direction of the length of the strip, being less than the operative diameter of each tool, rollers located between each couple of pairs of tools for driving the strip between the polishing tools, each tool including a rotatable frame, a plurality of spaced polishing discs carried by the frame and equidistant from the axis thereof, the polishing discs of one pair of each couple extending beyond one edge of the strip of glass and those of the other pair extending beyond the other edge, means for adjusting the angular position of one tool relatively to that of the other tool of each pair so that discs on one tool are in register with the discs of the opposed tool, means for rotating the two tools of one pair of a couple of pairs at the same speed in one sense, and means for rotating the two tools of the other pair of the couple of pairs at the same speed as the tools of the first mentioned pair but in the other sense.

8. Apparatus for polishing a strip of glass on both sides simultaneously, comprising a plurality of pairs of polishing tools located in couples, each tool being adapted to rotate on an axis perpendicular to the glass, the two tools of each pair being similar and operating on opposite sides of the glass and having their axes in a line, the distance between the axes of the two pairs of tools of each couple, measured from axis to axis, being less than the operative diameter of each tool, rollers located between each couple of pairs of tools for driving the strip between the polishing tools, each tool including a rotatable frame, a plurality of spaced polishing discs carried by the frame and equidistant from the axis thereof, the polishing discs of one pair of each couple extending beyond one edge of the strip of glass and those of the other pair extending beyond the other edge, means for adjusting the angular position of one tool relatively to that of the other tool of each pair so that discs on one tool are in register with the discs of the opposed tool, means for adjusting the angular position of the two tools of one pair relatively to that of the two tools of the other pair, means for rotating the two tools of one pair of a couple of pairs at the same speed in one sense, and means for rotating the two tools of the other pair of the couple of pairs at the same speed and at the same speed as the tools of the first mentioned pair, but in the other sense.

9. Apparatus for polishing a strip of glass on both sides simultaneously, comprising a plurality of pairs of polishing tools located in couples, each tool being adapted to rotate on an axis perpendicular to the glass, the two tools of each pair being similar and operating on opposite sides of the glass and having their axes in a line, the distance between the axes of the two pairs of tools of each couple, measured from axis to axis, being less than the operative diameter of each tool, the two pairs of tools of each couple having their axes on a line at right angles to the length of the strip of glass, rollers located between each couple of pairs of tools for driving the strip between the polishing tools, each tool including a rotatable frame, a plurality of spaced polishing discs carried by the frame and equidistant from the axis thereof, the polishing discs of one pair of each couple extending beyond one edge of the strip of glass and those of the other pair extending beyond the other edge, means for adjusting the angular position of one tool relatively to that of the other tool of each pair so that discs on one tool are in register with the discs of the opposed tools, means for adjusting the angular position of the two tools of one pair relatively to that of the two tools of the other pair, means for rotating the two tools of one pair of a couple of pairs at the same speed in one sense and means for rotating the two tools of the other pair of the couple of pairs at the same speed and at the same speed as the tools of the first mentioned pair, but in the other sense.

10. The method of polishing glass in strip form on both faces simultaneously as it is advanced lengthwise in a linear path, which method comprises simultaneously polishing by a rubbing action and with substantially the same pressures directly opposed corresponding surface areas of a plurality of different sections of the glass strip so that the forces exerted upon the opposed areas of the glass in any given section undergoing polishing are equal, opposite and normal to the linear path of the strip, and continuously and synchronously changing the region of application of the rubbing action on both sides of the strip from one position to another along a circular path and in the same direction.

11. The method of polishing glass in strip form on both faces simultaneously as it is advanced lengthwise in a linear path, which method comprises simultaneously polishing by a rubbing action with substantially the same pressures directly opposed corresponding surface areas of a plurality of different sections in contiguous zones of the glass strip whereby the forces exerted upon the opposed areas of the glass in any given section undergoing polishing are equal, opposite and normal to the linear path of the strip, and continuously and synchronously changing the region of application of the rubbing action on both sides of the strip from one position to another along a circular path, in the same direction as regards each zone but in opposite directions as between the zones.

12. The method according to claim 11 wherein the contiguous zones overlap.

13. The method according to claim 11 wherein the contiguous zones overlap and wherein the major dimension of the overlap lies in a direction coincident with the middle line of the strip.

FREDERIC BARNES WALDRON.